(12) United States Patent
Lee et al.

(10) Patent No.: US 11,736,883 B2
(45) Date of Patent: Aug. 22, 2023

(54) AUDIO DATA TRANSMITTING/RECEIVING METHOD USING BLUETOOTH LOW POWER IN WIRELESS COMMUNICATION SYSTEM, AND APPARATUS THEREFOR

(71) Applicant: LG ELECTRONICS INC., Seoul (KR)

(72) Inventors: Hyeonjae Lee, Seoul (KR); Minsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

(21) Appl. No.: 17/454,747

(22) Filed: Nov. 12, 2021

(65) Prior Publication Data

US 2022/0210594 A1 Jun. 30, 2022

(30) Foreign Application Priority Data

Sep. 14, 2020 (KR) .................. 10-2020-0117951

(51) Int. Cl.
*H04S 7/00* (2006.01)
*H04R 29/00* (2006.01)
*H04W 4/80* (2018.01)

(52) U.S. Cl.
CPC .......... *H04S 7/301* (2013.01); *H04R 29/002* (2013.01); *H04R 2420/07* (2013.01); *H04W 4/80* (2018.02)

(58) Field of Classification Search
CPC ... H04S 7/301; H04S 2400/13; H04R 29/002; H04R 2420/07; H04R 2430/01; H04W 4/80
See application file for complete search history.

(56) References Cited

U.S. PATENT DOCUMENTS

| 2004/0071294 | A1* | 4/2004 | Halgas, Jr. ........... | H04B 5/0006 381/59 |
| 2011/0268282 | A1* | 11/2011 | Paige ..................... | H04R 27/00 381/56 |

* cited by examiner

*Primary Examiner* — Kenny H Truong
(74) *Attorney, Agent, or Firm* — Lee Hong Degerman Kang & Waimey

(57) ABSTRACT

A method performed by a control device includes transmitting, to a first device, a signal for configuring an audio data output volume of the first device as a reference value, transmitting, to the first device, a test stream for calibration on an audio data output volume of devices consisting of a multi-channel surround system, and measuring an audio data output of the first device based on the reference value and the test stream. Further operations include transmitting, to second and third devices, a signal for configuring an audio data output volume of each of the second and third devices as a specific value, transmitting the test stream to the second and third devices, and measuring audio data outputs of each of the second and third devices which is outputted based on the specific value and the test stream.

4 Claims, 16 Drawing Sheets

[FIG. 1]
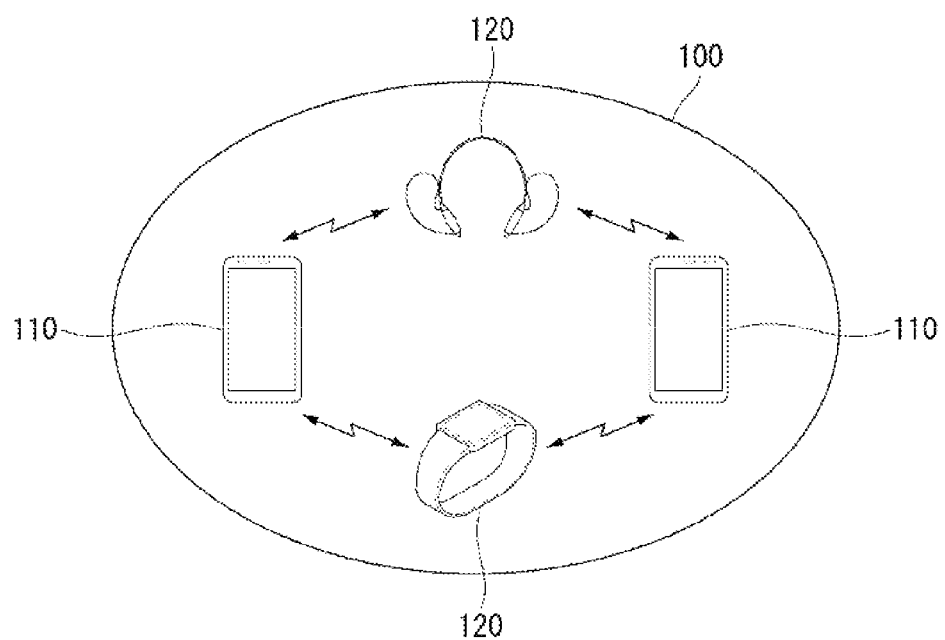

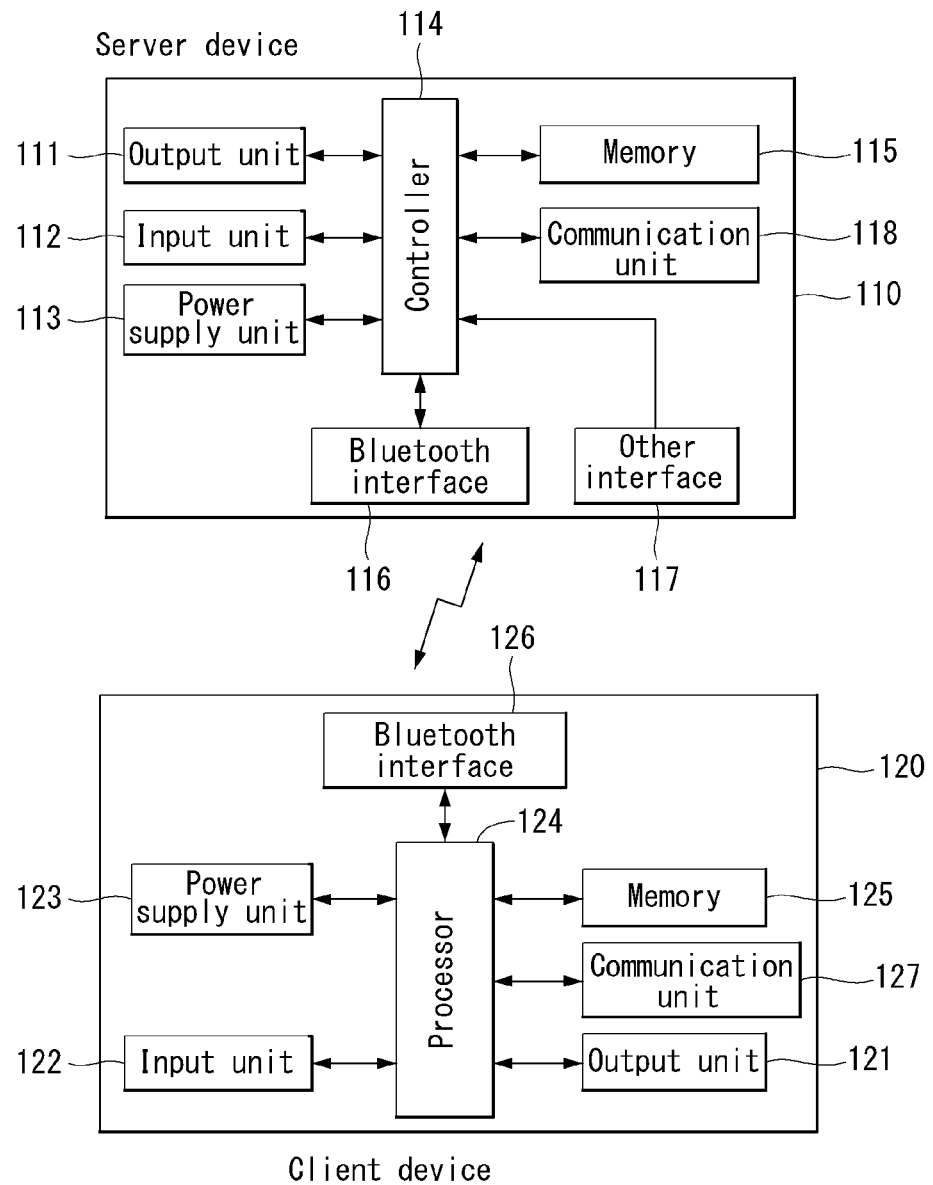
[FIG. 2]

[FIG. 3]
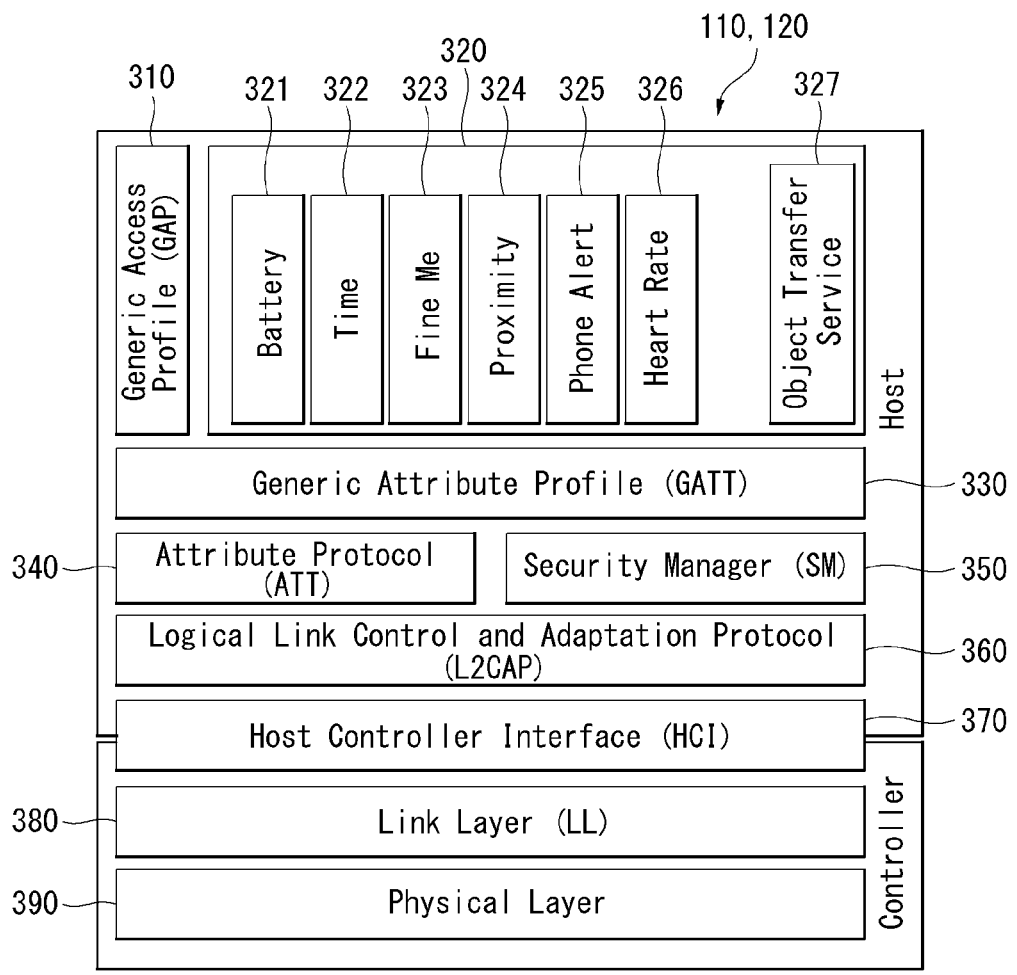

[FIG. 4]
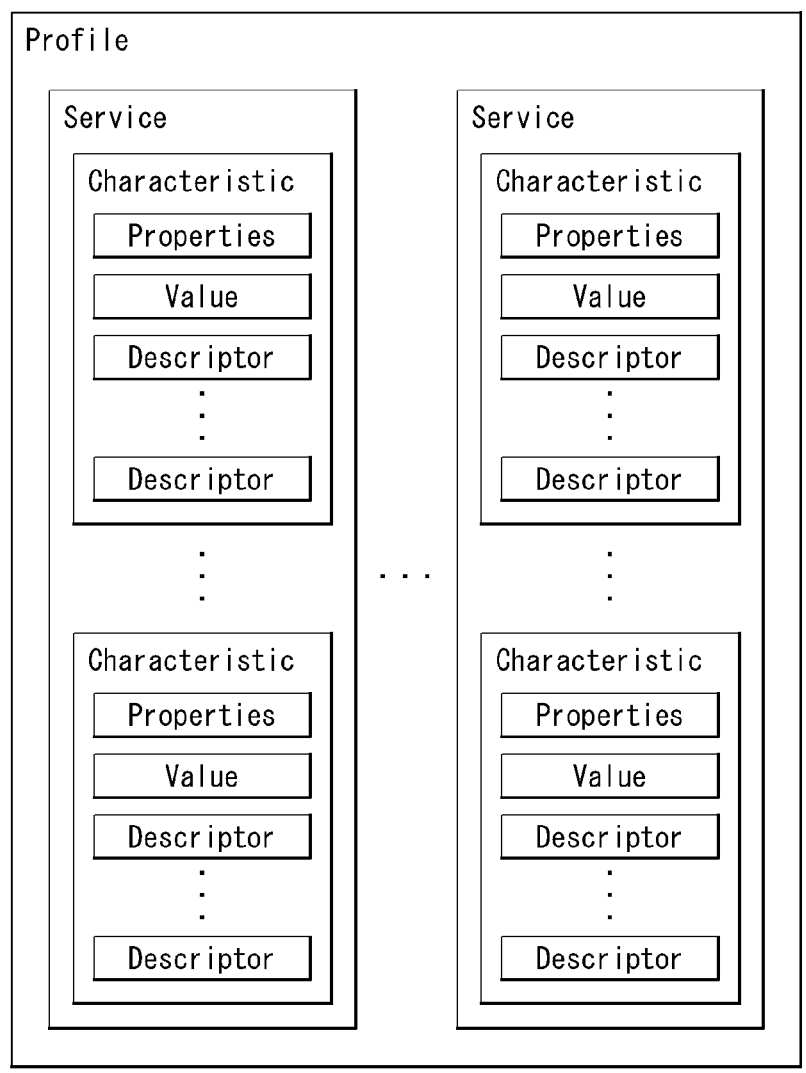

[FIG. 5]
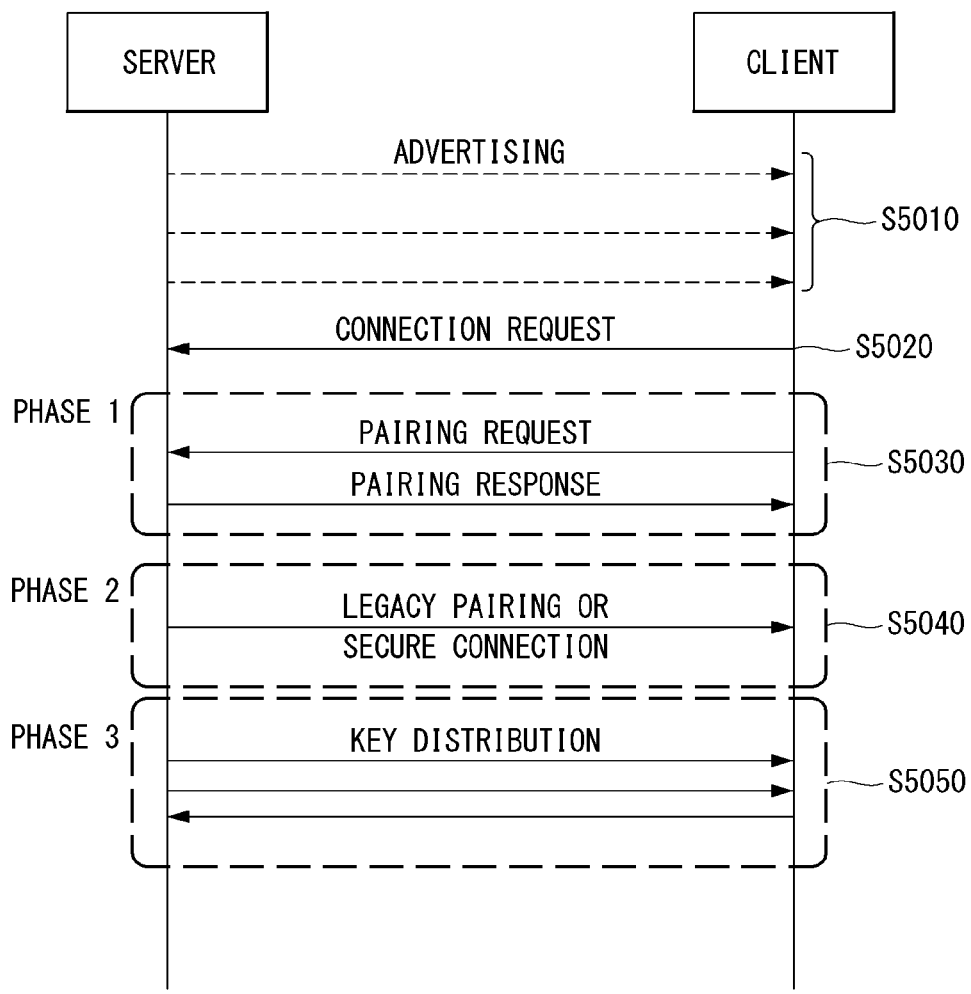

[FIG. 6]
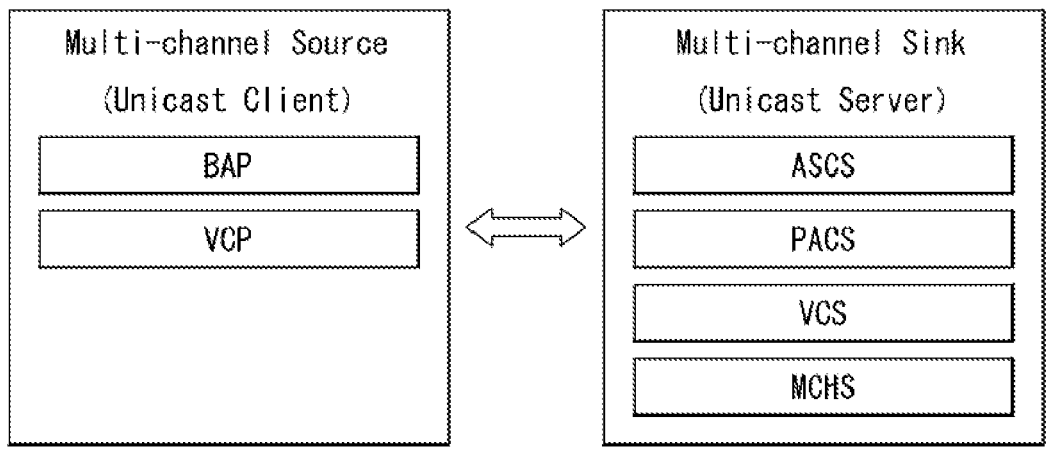
[FIG. 7]
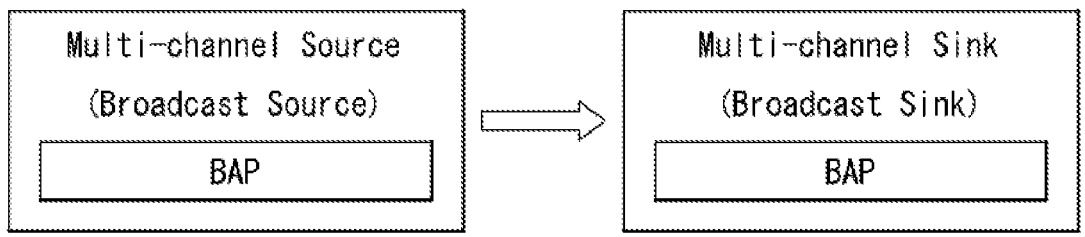

[FIG. 8]
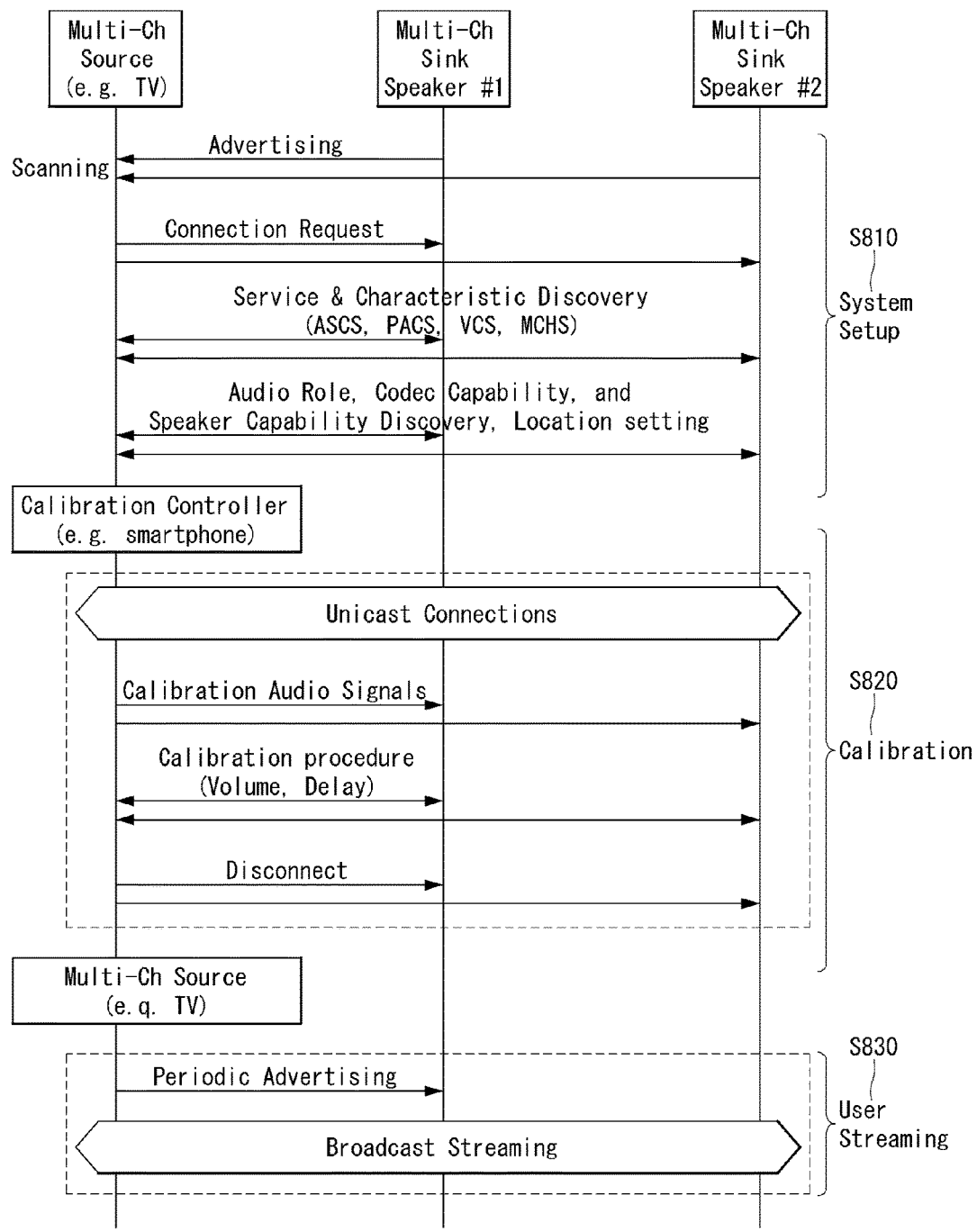

[FIG. 9]
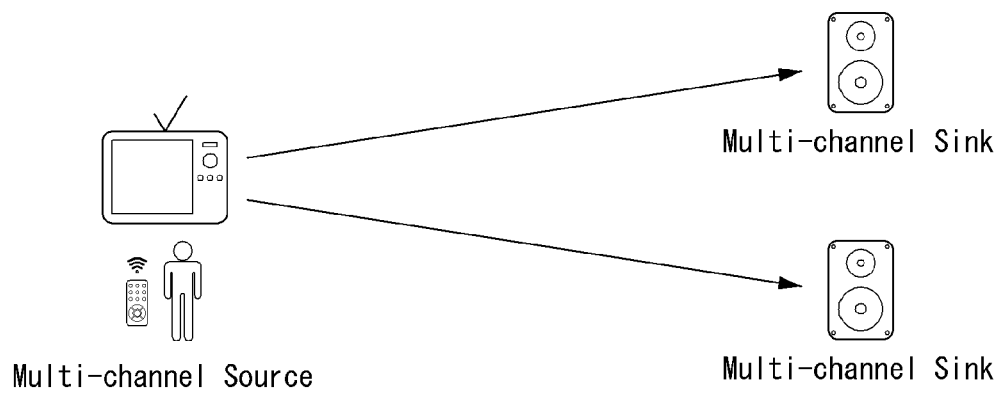
[FIG. 10]

[FIG. 11]
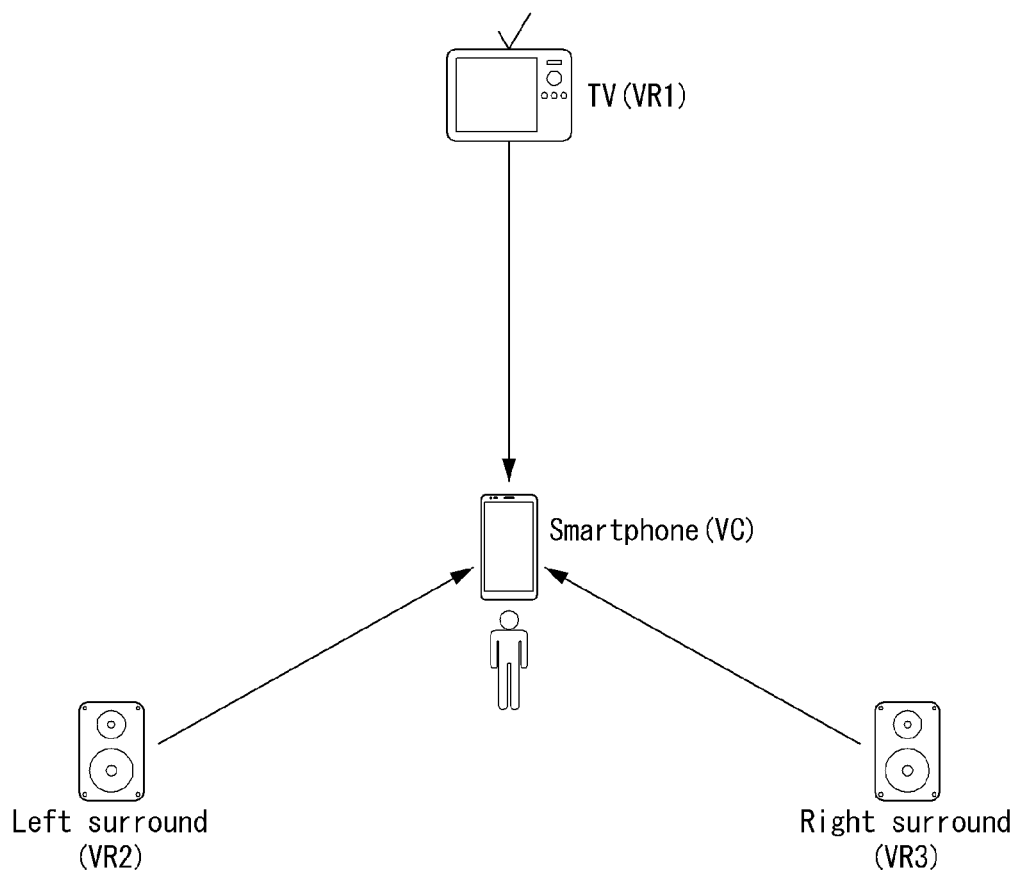

[FIG. 12]
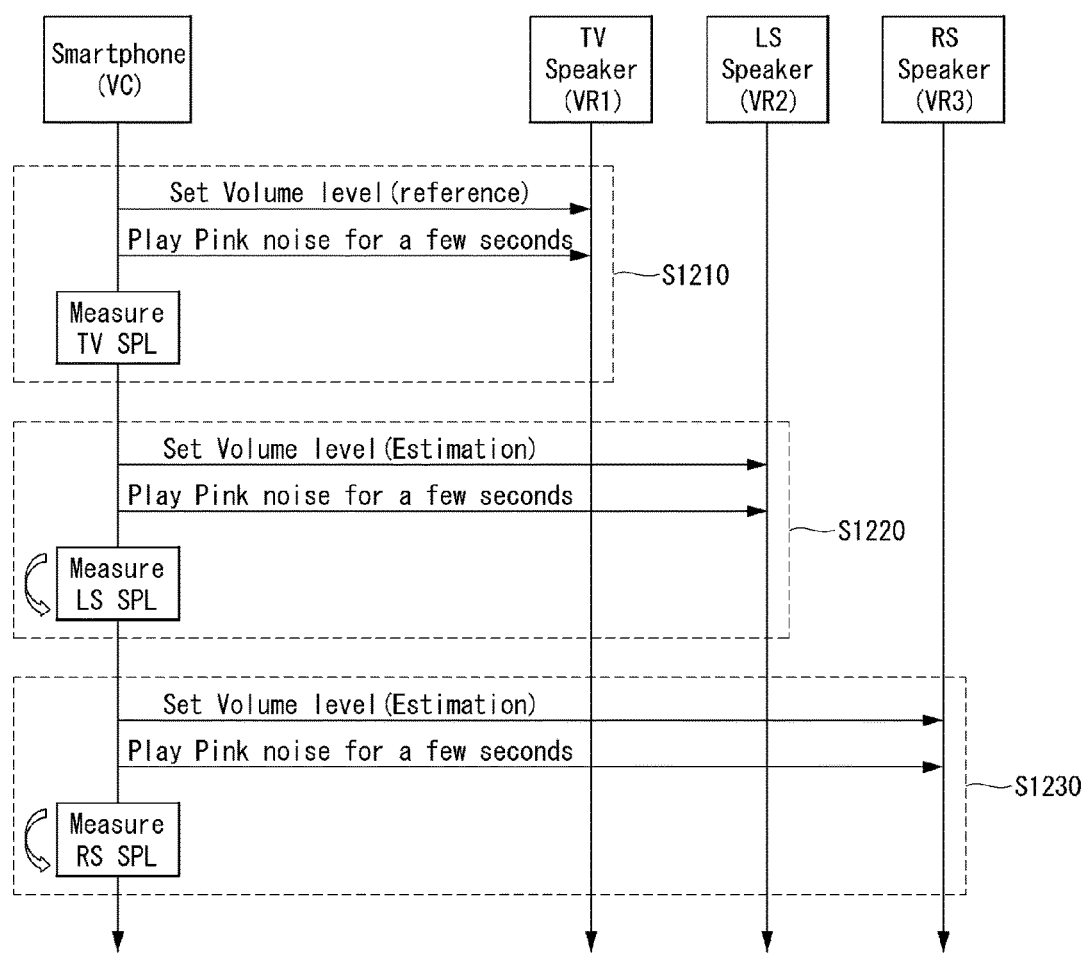

[FIG. 13]
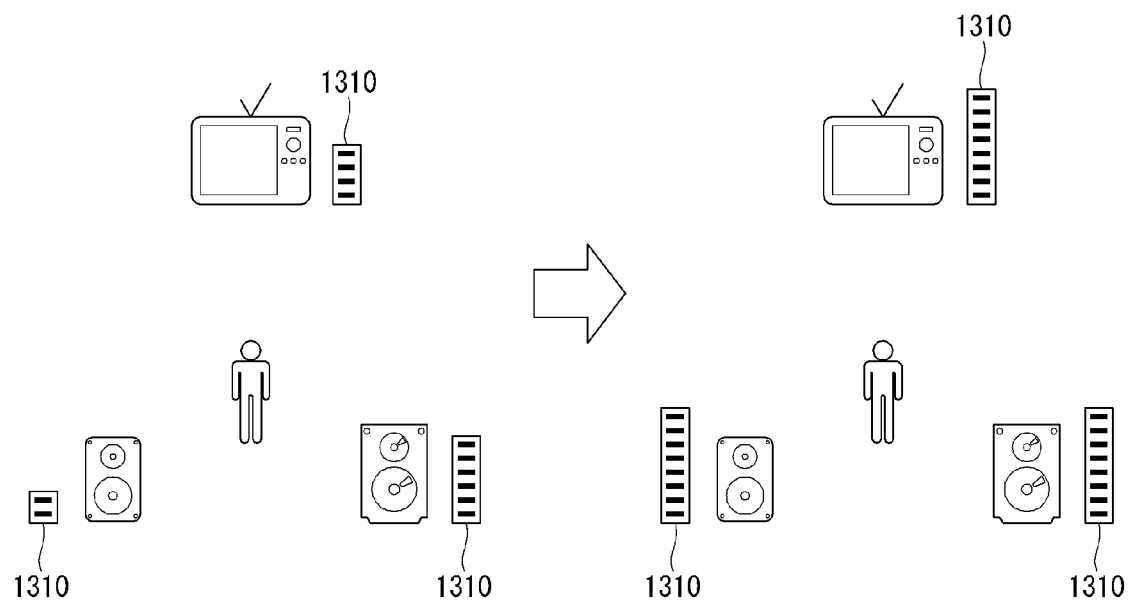
[FIG. 14]
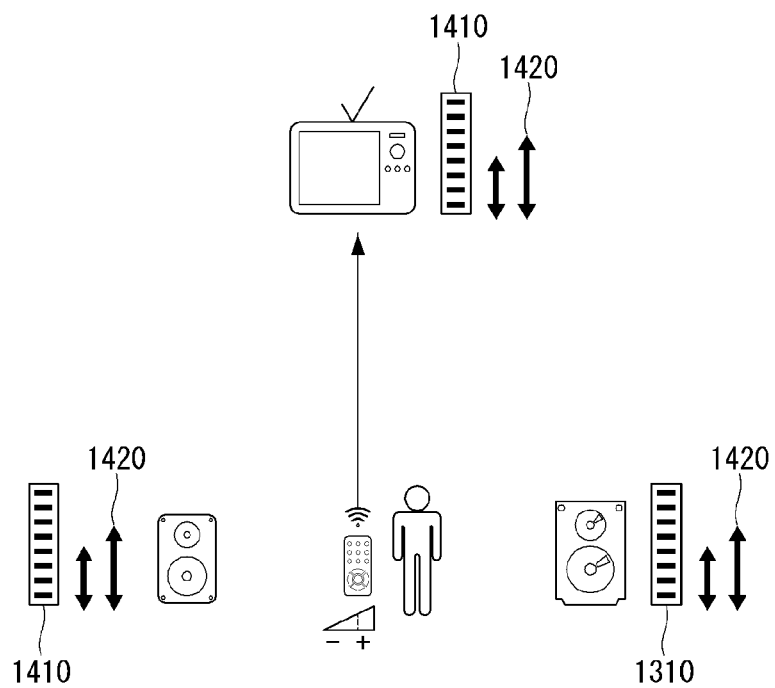

[FIG. 15]
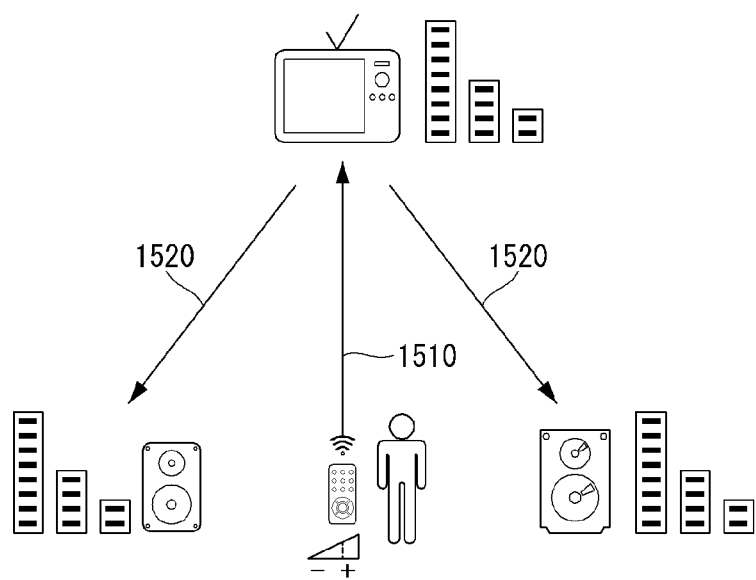

[FIG. 16]
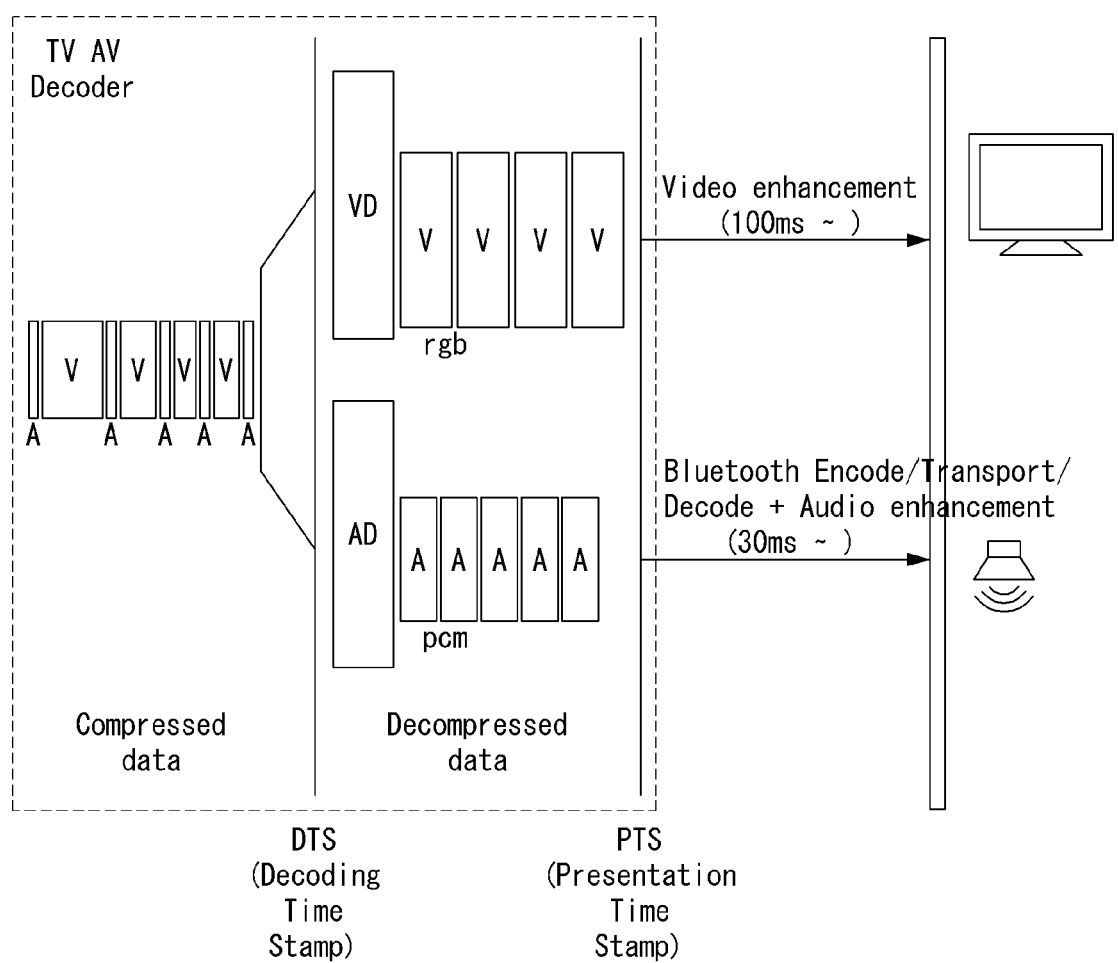

[FIG. 17]
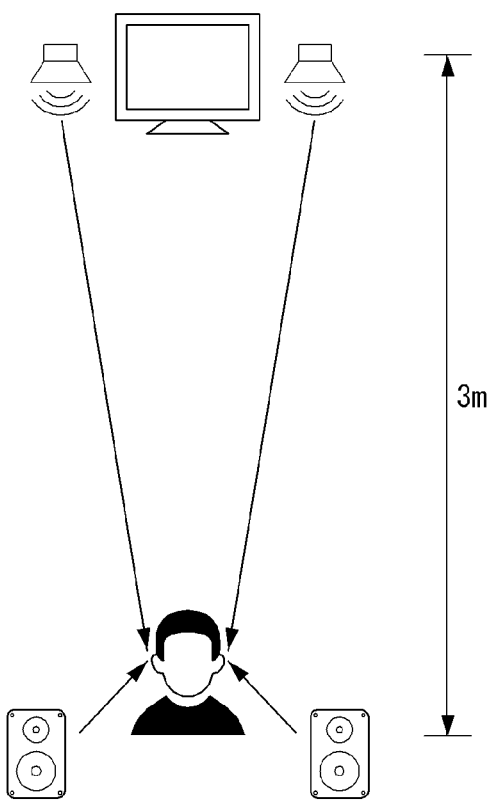
Distance difference between
TV speakers and rear speakers

[FIG. 18]
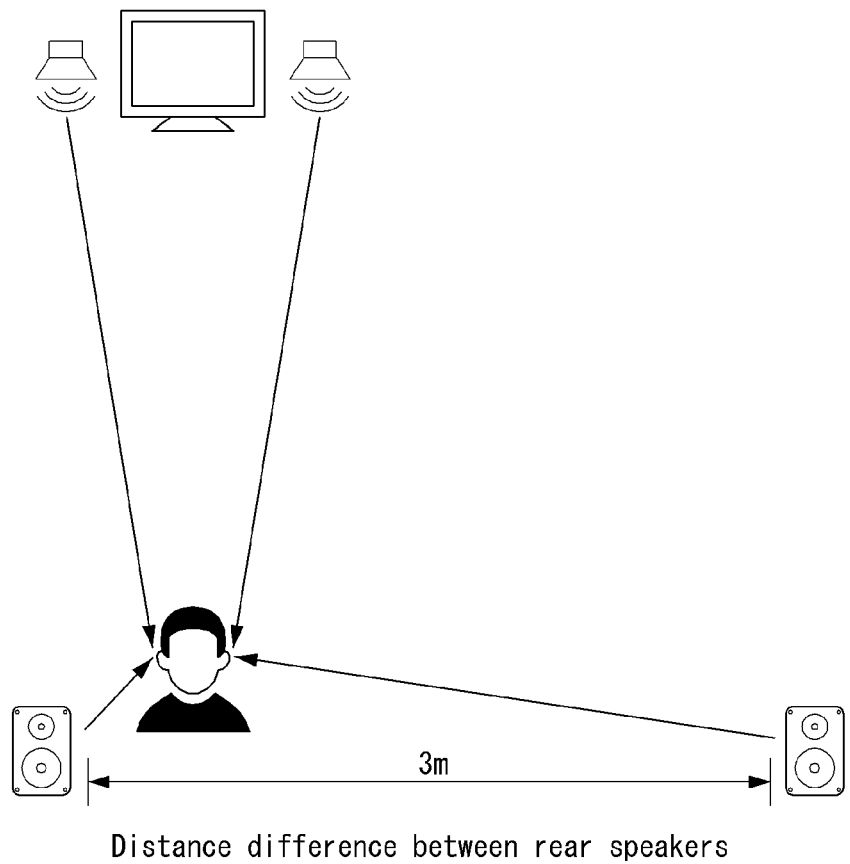
Distance difference between rear speakers

[FIG. 19]
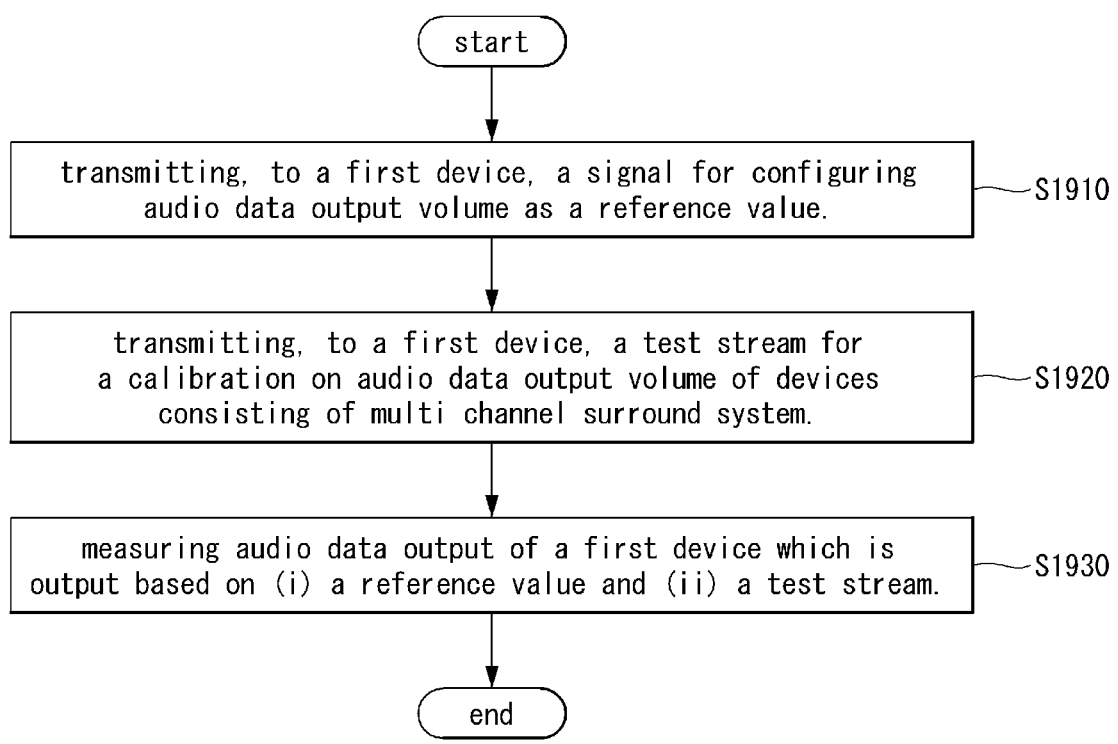

AUDIO DATA TRANSMITTING/RECEIVING METHOD USING BLUETOOTH LOW POWER IN WIRELESS COMMUNICATION SYSTEM, AND APPARATUS THEREFOR

CROSS-REFERENCE TO RELATED APPLICATION

Pursuant to 35 U.S.C. § 119(a), this application claims the benefit of earlier filing date and right of priority to Korean Patent Application No. 10-2020-0117951, filed on Sep. 14, 2020, the contents of which are hereby incorporated by reference herein in its entirety.

BACKGROUND OF THE INVENTION

Field of the Invention

The present disclosure relates to a wireless communication system, and more particularly, to a method and apparatus for transmitting audio data using short-range wireless communication.

Related Art

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

SUMMARY OF THE INVENTION

It is an object of the present disclosure to provide a method and an apparatus for the method performed by a control device in a short-range wireless communication system.

Furthermore, it is an object of the present disclosure to provide a method for a control device to calibrate a sound pressure level (SPL) of output volumes of devices constituting a multi-channel surround system, and an apparatus therefor.

Furthermore, it is an object of the present disclosure to provide a method and an apparatus for controlling the volume size of devices whose SPL of an output volume is calibrated by a control device.

The technical problems to be achieved in this specification are not limited to the technical problems mentioned above, and other technical problems not mentioned will be clearly understood by those of ordinary skill in the art to which the present invention belongs from the description below. will be able The present disclosure provides a method for a control device to perform in a short-range wireless communication system and an apparatus therefor.

More specifically, in the present disclosure, a method performed by a control device in a short-range wireless communication system, the method comprising: transmitting, to a first device, a signal for configuring an audio data output volume of the first device as a reference value; transmitting, to the first device, a test stream for calibration on a audio data output volume of devices consisting of a multi-channel surround system; and measuring an audio data output of the first device based on (i) the reference value and (ii) the test stream.

Furthermore, in the present disclosure, wherein the audio data output of the first device is measured based on a sound pressure level (SPL), and wherein the measured audio data output of the first device is used as a reference SPL for the calibration.

Furthermore, in the present disclosure, further comprising: transmitting, to a second device and a third device, a signal for configuring an audio data output volume of each of the second device and the third device as a specific value, respectively; transmitting the test stream to the second device and the third device, respectively; and measuring audio data outputs of each of the second device and the third device which is outputted based on (i) the specific value and (ii) the test stream.

Furthermore, in the present disclosure, wherein the audio data outputs of each of the second device and the third device is measured based on the SPL.

Furthermore, in the present disclosure, wherein a measurement on a SPL of the audio data outputs of each of the second device and the third device is repeatedly performed until each of the SPL of the audio data outputs of the second device and the third device is measured to be a same as the reference SPL.

Furthermore, in the present disclosure, wherein the reference SPL is determined based on an equation below,

[Equation]

Maximum SPL: Maximum audio data output volume=Reference SPL: Audio data output value configured as a reference value.

Furthermore, in the present disclosure, wherein a measurement on the SPL of the audio data outputs of each of the second device and the third device is performed based on an equation below,

[Equation]

Maximum SPL: Maximum audio data output volume=Measure SPL: Audio data output value configured as a specific value.

Furthermore, in the present disclosure, further comprising: configuring the audio data output volume of the devices consisting of the multi-channel surround system.

Furthermore, in the present disclosure, wherein the configuring the audio data output volume of the devices consisting of the multi-channel surround system is performed based on a pre-configured table on a mapping relationship between a audio data output volume value and a SPL value.

Furthermore, in the present disclosure, a control device in a short-range wireless communication system, the control device comprising: a transmitter for transmitting a radio signal; a receiver for receiving a radio signal; and a processor operatively connected to the transmitter and the receiver, wherein the processor is configured to control: the transmitter to transmit, to a first device, a signal for configuring an audio data output volume of the first device as a reference value; the transmitter to transmit, to the first device, a test stream for calibration on a audio data output volume of devices consisting of a multi-channel surround system; and to measure an audio data output of the first device based on (i) the reference value and (ii) the test stream.

In the present disclosure, there is an effect that the control device can calibrate the SPL (sound pressure level) of the output volume of the devices constituting the multi-channel surround system.

Furthermore, in the present disclosure, there is an effect that the volume size of the devices for which the SPL of the output volume is calibrated by the control device can be controlled.

The effects obtainable in the present disclosure are not limited to the above-mentioned effects, and other effects not mentioned are clearly understood by those of ordinary skill in the art to which the present invention belongs from the description below.

BRIEF DESCRIPTION OF THE DRAWINGS

The accompanying drawings, which are included as part of the detailed description to help the understanding of the present invention, provide embodiments of the present invention, and together with the detailed description, describe the technical features of the present invention.

FIG. 1 is a schematic view illustrating an example of a wireless communication system using a Bluetooth low energy technology to which the present disclosure is applicable.

FIG. 2 illustrates an example of an internal block diagram of a device capable of implementing methods proposed by the present disclosure.

FIG. 3 illustrates an example of a Bluetooth communication architecture to which methods proposed by the present disclosure may be applied.

FIG. 4 illustrates an example of a structure of a generic attribute profile (GATT) of Bluetooth low energy.

FIG. 5 is a flowchart showing an example of a connection procedure method in Bluetooth low energy technology to which the present disclosure may be applied.

FIGS. 6 and 7 illustrate an example of roles of devices in a multi-channel surround system.

FIG. 8 shows the overall protocol flow from system setup to audio streaming playback for a two-speaker example.

FIG. 9 is a diagram illustrating an example in which a source device performs volume control on a sink device(s).

FIG. 10 is a diagram illustrating an example in which a source device performs volume control.

FIG. 11 illustrates one example of the calibration settings of TV and two rear speakers.

FIG. 12 is a flowchart illustrating an example in which the volume calibration method proposed in the present disclosure is performed.

FIGS. 13 and 14 illustrate an example of a method for master volume control.

FIG. 15 illustrates an example of a method for master volume control based on a mapping table proposed in the present disclosure.

FIG. 16 shows an example for a method for audio/video synchronization proposed in the present disclosure.

FIGS. 17 and 18 illustrate an example of a method for Speaker Delay Calibration proposed in the present disclosure.

FIG. 19 illustrates a flow chart of an example for a method peformed by a control device which is proposed in the present disclosure.

DESCRIPTION OF EXEMPLARY EMBODIMENTS

In order to help understanding of the present disclosure, the accompanying drawings which are included as a part of the Detailed Description provide embodiments of the present disclosure and describe the technical features of the present disclosure together with the Detailed Description. Like reference numerals principally designate like elements throughout the specification. Further, in describing the present disclosure, a detailed explanation of known related technologies may be omitted to avoid unnecessarily obscuring the subject matter of the present disclosure. Further, it is noted that the accompanying drawings are only for easily understanding the spirit of the present disclosure and it should not be interpreted that the spirit of the present disclosure is limited by the accompanying drawings.

Hereinafter, a method and an apparatus related with the present disclosure will be described in more detail with reference to drawings. In addition, a general term used in the present disclosure should be interpreted as defined in a dictionary or contextually, and should not be interpreted as an excessively reduced meaning. Further, a singular form used in the present disclosure may include a plural form if there is no clearly opposite meaning in the context. In the present application, a term such as "comprising" or "including" should not be interpreted as necessarily including all various components or various steps disclosed in the specification, and it should be interpreted that some component or some steps among them may not be included or additional components or steps may be further included. Suffixes "unit", "module", and "section" for components used in the following description are given or mixed in consideration of easy preparation of the specification only and do not have their own distinguished meanings or roles. The terms "first", "second", and the like are used to differentiate a certain component from other components, but the scope of should not be construed to be limited by the terms.

FIG. 1 is a schematic view illustrating an example of a wireless communication system using a Bluetooth low energy technology to which the present disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notice/notification message and an indication message to the client device in order to provide data information to the client device. In addition, when the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

FIG. 2 illustrates an example of an internal block diagram of a device capable of implementing methods proposed by the present disclosure.

As shown in FIG. 2, the server device 110 includes a display unit 111, a user input interface 112, a power supply unit 113, a processor (or controller) 114, a memory unit 115, a Bluetooth interface 116, another interface 117, and a communication unit (or transmission/reception unit) 118.

The display unit 111, user input interface 112, power supply unit 113, processor 114, memory unit 115, Bluetooth interface 116, another interface 117, and communication unit 118 are functionally interconnected so as to perform a method according to an embodiment of the present disclosure.

Furthermore, the client device 120 includes a display unit 121, a user input interface 122, a power supply unit 123, a processor 124, a memory unit 125, a Bluetooth interface 126, and a communication unit (or transmission/reception unit) 127.

The display unit 121, user input interface 122, power supply unit 123, processor 124, memory unit 125, Bluetooth interface 126, and communication unit 127 are functionally interconnected so as to perform a method according to an embodiment of the present disclosure.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored.

The processor 114, 124 refers to a module for controlling an overall operation of the server device 110 or the client device 120, and controls the server device or the client device in order in order to request the transmission of a message through the Bluetooth interface or other interface and to process a received message.

The processors 114 and 124 may be represented by a control section, a control unit, a controller, and the like.

The processors 114 and 124 may include an application-specific integrated circuit (ASIC), another chipset, a logic circuit, and/or a data processing device.

The processors 114 and 124 control the communication unit to receive an Advertisement message from the server device 110, transmit a Scan Request message to the server device 110, control the communication unit to receive a Scan Response message from the server device 110 in response to the scan request, and control the communication unit to transmit a Connect Request message to the server device 110 in order to establish a Bluetooth connection with the server device 110.

In addition, after a Bluetooth LE connection is established through the connection procedure, the processors 114 and 124 control the communication unit so as to read or write data from or in the server device 110 using an attribute protocol.

The memory units 115 and 125 may include a read-only memory (ROM), a random access memory (RAM), a flash memory, a memory card, a storage medium, and/or other storage devices.

The communication units 118 and 127 may include a baseband circuit for processing a radio signal. When the embodiment is implemented by software, the aforementioned technique may be implemented by a module (a process, a function, and the like) that performs the aforementioned function. The module may be stored in the memory unit and executed by the processor.

The memory units 115 and 125 may be positioned inside or outside the processors 114 and 124 and connected with the processors 114 and 124 by various well-known means.

The display units 111 and 121 refer to modules for providing state information of the device and message exchange information to the user through a screen.

The power supply units 113 and 123 refer to modules that receive external power and internal power under the control of the control unit and supply power required for operating each of the components.

As described above, the BLE technology may have a small duty cycle and significantly reduce power consumption through low data rate.

FIG. 3 illustrates an example of a Bluetooth communication architecture to which methods proposed by the present disclosure may be applied.

Specifically, FIG. 3 illustrates an example of an architecture of Bluetooth low energy (LE).

As shown in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth specification using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.
② Include: Define a relationship between services.
③ Characteristics: A data value used by a service
④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.
Time: A method for exchanging time information.
FindMe: A method for providing an alarm service according to the distance.
Proximity: A method for exchanging battery information.
Time: A method for exchanging time information The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption may be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE specification, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices may scan the discoverable device through an advertising (or broadcast) physical channel.

Both of the discovering device and the discoverable device may already have been connected to other Bluetooth devices in a piconet Connecting Procedure A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters a connection state when the device performing the connection request, i. E., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave. The master controls a timing of a connection event and the connection event refers to a time at which the master and the slave are synchronized.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type field of an advertising channel included in the header supports PDU types defined in Table 1 below.

TABLE 1

| PDU Type | PDU Name | Channel | Permitted PHYs | | |
|---|---|---|---|---|---|
| | | | LE 1M | LE 2M | LE Coded |
| 0000b | ADV_IND | Primary Advertising | • | | |
| 0001b | ADV_DIRECT_IND | Primary Advertising | • | | |
| 0010b | ADV_NONCONN_IND | Primary Advertising | • | | |
| 0011b | SCAN_REQ | Primary Advertising | • | | |
| | AUX_SCAN_REQ | Secondary Advertising | • | • | • |
| 0100b | SCAN_RSP | Primary Advertising | • | | |
| 0101b | CONNECT_IND | Primary Advertising | • | | |
| | AUX_CONNECT_REQ | Secondary Advertising | • | • | • |
| 0110b | ADV_SCAN_IND | Primary Advertising | • | | |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by the present disclosure.

FIG. 4 illustrates an example of a structure of a generic attribute profile (GATT) of Bluetooth low energy.

Referring to FIG. 4, a structure for exchanging profile data of the Bluetooth low energy may be described.

Specifically, the generic attribute profile (GATT) is a definition of a method in which data is transmitted and received by using services and characteristics between the Bluetooth LE devices.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

A GATT-based operation structure used in the Bluetooth LE may be based on THE profile, the service, and the characteristic, and may have a vertical structure illustrated in FIG. 5.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.

handle: Address of attribute
Type: Type of attribute
Value: Value of attribute
Permission: Access authority to attribute FIG. 5 is a flowchart showing an example of a connection procedure method in Bluetooth low power energy technology to which the present disclosure may be applied.

A server transmits to a client an advertisement message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smartphone, etc.

As described above, in Bluetooth, communication is performed over a total of 40 channels through the 2.4 GHz band. Three channels among 40 channels as the advertising channels are used for exchanging sent and received for establishing the connection, which include various advertising packets.

The remaining 37 channels are used for data exchange after connection to the data channel.

The client may receive the advertisement message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.

Temporary Key: Key made for creating the STK
Short Term Key (LTK): Key value used for making encrypted connection between devices When the secure connection is performed in Phase 2, a 128-bit long term key (LTK) is generated.

Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by forming the encrypted link.

Overview

The present disclosure describes procedures for the following aspects of a wireless multi-channel surround-sound system:

(1) setup and configuration (2) volume calibration and master volume control of several speakers with different electro-acoustic characteristics (3) ensuring A/V synchronization amongst the system (4) delay calibration based on speaker placement within a room Problem Definition The present disclosure also describes device roles and requirements for each role.

The set of Bluetooth LE Audio GAF specifications provides the architecture for transmitting and receiving more than two channels of audio at a time. However, a top-level profile that provides the necessary configuration of these specifications to enable multi-channel use cases has not yet been created. This profile aims to fill this void.

The present disclosure specifically focuses on surround-sound speaker systems that reproduce multi-channel audio from audio/video or audio-only multi-channel programs. For the purposes of this disclosure, the term "multi-channel" means more than two channels.

The number of channels discretely reproduced by the system scales with the number of speakers used.

When configuring a multi-channel surround system, procedures for the discovery of suitable speakers and appropriate configuration of each individual speaker are necessary.

Selection Criteria

It is assumed that this top-level profile is based on GAF [5]. GAF is designed to support top level LE audio profiles. Therefore, the selection criteria for this top-level profile is identical to the selection criteria in the GAF 0.5 specification.

Justification of Choice

Include speaker capability reporting in PACS or a new service

As PACS is the mechanism of reporting audio capability of a sink to the source, speaker capabilities could be added to it. The proposal to add a speaker capabilities characteristic to PACS was discussed at the New Orleans GAWG F2F in February 2020. GA members generally thought the speaker capabilities characteristic definition needed more and is probably not within the scope of PACS.

Therefore, a speaker capabilities characteristic will be defined in a Multi-channel Surround Service specification to accompany the present disclosure. Types of information this characteristic might include the following:

Maximum output of the speaker in dB SPL (given a certain, specified measurement method)

Frequency response (low-frequency and high-frequency 6-dB rolloff)

Subwoofer flag (to show if this speaker is capable of subwoofer)

Client-Writable Speaker Location: Enable in PACS or in a New Service

Similar to speaker capabilities, the potential need for a BAP client device to update the Audio Location for a speaker (BAP server device) was also discussed at the New Orleans GAWG F2F in February 2020. Unlike speaker capabilities, GAWG members agreed that making the PACS Sink Audio Location characteristic client writable was appropriate.

Thus, a BAP client may update a speaker's location by writing the Audio Location characteristic in that speaker.

Implementing Volume Control at Source or Sink

As volume control can be done either at source and sink. Lots of mis-behavior happens when volume control at one place is not fixed. For example, when sink gain control is 0, no matter how the source volume changes, there will be no sound. When sink gain is set very low, even source volume is set high, output sound will be very small.

So design philosophy we are based on the present disclosure is to control only one place volume while the other place volume is locked. Either source or sink gain calibration as master volume control is explained.

Implementating Speaker Delay Calibration at Source or Sink

Because the distance of each speaker from the listening position can be different, there needs to be a mechanism to calibrate the playback timing for each output channel.

The playback timing for each output channel could conceivably be performed by either the source device (TV) or the individual sink devices (speakers). If the TV is required to adjust timing for each separate speaker, it will require more CPU and memory as the speaker count increases. On the other hand, it is expected to be simple to adjust playback timing at speaker because each speaker will already have buffer memory for handling BAP Presentation Delay functionality.

Therefore, the sink devices will be expected to perform delay calibration to synchronize playback timing.

Unicast Versus Broadcast Topology

When using only two speakers, unicast can be used like it is for earbuds. However, if more than two speakers are used, the system setup complexity scales with the number of speakers. The timing calculation of each individual speaker will add complexity exponentially.

Think of conventional TV system which only uses broadcast, using broadcast with FEC will be as reliable as unicast with retransmission.

So, the broadcast topology is preferred over unicast point-to-multipoint connections for ease of setup and speaker synchronization, as well as system extensibility.

Design Architecture

The present disclosure defines two roles, Multi-channel Source and Multi-channel Sink.

The Multi-channel Source is the device that controls the setup and configuration of the the multi-channel surround-sound system and sends multiple audio streams to multiple Multi-channel Sink devices. Typical devices implementing the Multi-channel Source role include TVs, smart speakers, and personal computers.

The Multi-channel Sink is a speaker device that receives one or more audio channels from the Multi-channel Source and renders it (them) for playback from its internal transducer(s). Typical devices implementing the Multi-channel Sink role include portable, battery-powered speakers and smart speakers.

FIGS. 6 and 7 illustrate an example of roles of devices in a multi-channel surround system.

More specifically, FIG. 6 is a diagram illustrating an example of roles of devices during the setup and configuration. And FIG. 7 is a diagram illustrating an example of the roles of devices during audio data streaming. Herein, FIG. 7 illustrates audio data streaming based on broadcast case, audio data streaming also can be based on unicast case.

The Multi-channel Source operates in the BAP Unicast Client role during setup and configuration of the multi-channel surround-sound system so that it can perform discovery and configuration of Multi-channel Sink devices. It operates in the BAP Broadcast Source role when sending the audio streams to the Multi-channel Sink devices.

The Multi-channel Sink operates in the BAP Unicast Server role during setup and configuration of the multi-channel surround-sound system. It operates in the BAP Broadcast Sink role when receiving audio streams from the Multi-channel Source device.

The Multi-channel Sink device will also need to include the Volume Control Service for system setup and configuration.

A Multi-channel Surround Service (MCHS) will be defined to include characteristics holding speaker capability information necessary for the operation of this profile.

System Setup

When setting up the surround-sound system, the user will decide how many speakers will be joined to the system. The present disclosure does not place a limit on the number of speakers that may be used. However, when the standard LE Audio LC3 codec is in use, the most common system configuration is anticipated to be a TV acting as the Multi-channel Source with two speakers acting as Multi-channel Sinks. This section uses this system configuration as an example to explain system setup.

If the user decides to use two speakers in the Left Surround (LS) and Right Surround (RS) positions, the user will place the two speakers at the suitable positions. When the user turns on the speakers, each speaker will advertise its existence to the source, as well as its support of the Multi-channel Surround Profile.

After scanning the speakers' advertisements, the source will connect to each speaker and read PACS characteristics of each speaker. In addition to PACS characteristics, additional speaker capabilities, such max Sound Pressure Level (SPL) output and frequency response, will be discovered by the source via an instance of the Multi-channel Surround Service running on each speaker.

The source can either expose this information to the user to decide whether the external speakers are suitable for the surround system, or automatically determine this itself. For example, if a TV is capable of producing a significantly louder output than the speakers the user has selected to render LS and RS, the TV can inform the user of this disparity. Then, the user can decide whether to still use the speakers or not.

After the speaker's suitability is determined, the Multi-channel Source will configure each speakers' Audio Location (if necessary) using a GATT write procedure and codec configuration. The initial Audio Location values for each speaker will be overwritten if necessary to be appropriate during the multi-channel streaming session.

After system setup is complete, calibration for volume and delay is executed. The calibration for volume and delay is described below.

The multi-channel stream will be transmitted via a Broadcast Isochronous Stream (BIS) with each speaker decoding and rendering the Audio Channel(s) in the BIS that correspond to its supported Audio Location(s). Unicast can be used too for streaming especially for 2 channel case because it's similar to two ear bud connection.

FIG. 8 shows the overall protocol flow from system setup to audio streaming playback for a two-speaker example.

S810: The source device performs a system setup procedure for initial configuration of the system with the two sink device. The initial configuration of the system is done using BAP procedures over a Unicast connection. Speaker Capability and Location are additionally defined in the present disclosure. If more speakers are added to the surround-sound system after the initial configuration of the system is done, a Unicast connection is re-established between the Multi-channel Source and each Multi-channel Sink to reconfigure the system. The required codec capability and configuration parameters and QoS parameters also can be defined in the present disclosure.

S820: Thereafter, the source device and the two sink device performs a calibration procedure with calibration controller. More specifically, calibration controller transmits an audio signals for calibration to the source device and the two sink devices. Thereafter, the source device and the two sink devices performs a calibration procedure for volume or delay calibration After the calibration procedure is performed, each of connections between (i) the calibration controller and (ii) the source device and the two sink devices.

S830: The source device then broadcasts the audio data for audio data streaming to the two sink devices.

In FIG. 8, audio data streaming based on a broadcast method is exemplified, but this is only for convenience of description, and the method proposed in the present disclosure is not limited thereto.

Volume Calibration & Master Volume Control

Hereinafter, Acoustically Balanced Volume Control, Volume Calibration at setup, and Master volume control will be described.

Acoustically Balanced Volume Control

Because the multi-channel surround-sound system will be comprised of multiple wireless speakers that may have different electro-acoustic characteristics, a method is needed to ensure the sound pressure level (SPL) output from all speakers changes in an acoustically balanced fashion when the system-wide volume is adjusted by the end user during watching a movie. For example, when a TV is used to render the left/right front speaker pair, it will have different maximum volume level and low-frequency cut-off than the other speakers. The volume-to-output-SPL curves of the TV and speakers are also likely to have different non-linearities (mostly log scale) due to the common use of multi-band limiters in TVs and small speakers. The actual loudness output of each speaker needs to change in the same amount for each "click" of the volume control. A TV acting in this role is expected to potentially drive its own speakers to render one or more front audio channels.

FIG. 9 is a diagram illustrating an example in which a source device performs volume control on a sink device(s).

In a wireless speaker system, we need to consider where the volume is controlled. Volume can be controlled both from the source and the sink. The final output volume level in SPL is a combination of source and sink volume. Because of this mixed controllability, sometimes the final output volume level is unexpected.

FIG. 10 is a diagram illustrating an example in which a source device performs volume control. More specifically, FIG. 10 illustrates how the TV can control volume of its own speakers while also controlling a speaker's volume by using VCS running on the speaker. In FIG. 10, the speaker also can control its volume locally via its volume knob.

So, to remove unexpectancy, the speaker's local volume control shall be overridden by VCS. If VCS set volume level to 100, regardless of local volume knob value, the speaker shall expose 100.

The general calibration procedure is performed like below:

VC will choose a speaker SPL (TV) as a reference. Herein, the VC may be Smartphone.

The other speakers will be set to output the same SPL as the reference speaker by repetitive VCS volume control procedures.

Volume Calibration at Setup

This method is related to calibrating volume of each speakers (including TV speakers) at common maximum volume at setup stage. That is, the volume of each speakers means audio data output volume of each speakers.

During audio data streaming (ex, watching a movie), volume is controlled by only source side gain attenuation to have acoustically balanced volume control.

During the initial setup of the surround sound system, the initial volume of each speaker may be different due to the speakers being previously used in different environments and for different reasons. Also, volume calibration is necessary because of distance difference from each speaker to user.

The speaker's volume are (1) adjusted to the same "common maximum" using VCP/VCS during setup and (2) locked at that common maximum level. This common maximum would be determined by setting the volume of each sink device as well as TV speakers as high as they can go without distortion.

The basic procedure of calibration will follow below steps:

(1) Short period of volume test stream (eg, pink noise) will be sent from smartphone (Volume Controller: VC) to each speakers.

(2) Measure each speakers (Volume Render: VR) volume SPL by smartphone mic close to user (hearing reference point).

(3) A few repetitive steps will be done to calibrate common maximum volume to all speakers.

In this method related to calibrating volume of each speakers (including TV speakers), the sink device(s) and the source device may be referred to as a first device or a second device, or the like and VC device may be referred to as a control device, or the like.

FIG. 11 illustrates one example of the calibration settings of TV and two rear speakers.

Referring to FIG. 11, a user's smartphone operates as a VC device, and a TV, a left surround speaker, and a right surround speaker operate as a VR device. Volume calibration setting for TV and two rear speakers is performed by the smartphone.

FIG. 12 is a flowchart illustrating an example in which the volume calibration method proposed in the present disclosure is performed.

More specifically, FIG. 12 shows an example in which the VC device performs volume calibration for three VR devices.

S1210: First, the VC device sets the volume level of the VR 1 device to a specific value. Here, the volume level set in the VR 1 device may be used as a reference for setting the volume level of other VR devices. 12 exemplifies the case in which the TV speaker operates as a VR 1 device, but the present method is not limited thereto. More specifically, any type of device can operate as a VR 1 device as long as it is a source device of a multi-channel system.

Thereafter, the VC device may transmit a test stream for measuring the SPL of the VR1 device to the VR1 device. Here, the test stream is output from the VR1 device. The test stream can be pink noise. The VC device measures the SPL of the test stream output to the VR1 device.

S1220: Thereafter, the VC device sets the volume level of the VR 2 device to a specific value. Here, the volume level set in VR2 may be an estimated value estimated by the VC device. That is, the estimated value used for setting the volume level for VR2 may be any estimated value that is expected to have the same SPL value as the SPL value of the test stream output from the VR1 device. Also, the estimated value may be a preset value.

Thereafter, the VC device may transmit a test stream for measuring the SPL of the VR2 device to the VR2 device. Here, the test stream is output from the VR2 device. The test stream can be pink noise. The VC device measures the SPL of the test stream output to the VR2 device. The VC device may repeatedly perform step S1220 until the SPL value of the test stream output from the VR2 device is measured to be the same as the SPL value of the test stream output from the VR1 device. That is, step S1220 is repeatedly performed until the volume of the VR2 device are same as the reference volume of the VR1 device.

S1230: Thereafter, the VC device sets the volume level of the VR 2 device to a specific value. Here, the volume level set in VR2 may be an estimated value estimated by the VC device. That is, the estimated value used for setting the volume level for VR2 may be any estimated value that is expected to have the same SPL value as the SPL value of the test stream output from the VR1 device. Also, the estimated value may be a preset value.

Thereafter, the VC device may transmit a test stream for measuring the SPL of the VR2 device to the VR2 device. Here, the test stream is output from the VR2 device. The test stream can be pink noise. The VC device measures the SPL of the test stream output to the VR2 device. The VC device may repeatedly perform step S1230 until the SPL value of the test stream output from the VR2 device is measured to be the same as the SPL value of the test stream output from the VR1 device. That is, step S1230 is repeatedly performed until the volume of the VR3 device are same as the reference volume of the VR1 device.

Once all the speakers are set to same volume level, only the source side volume (attenuation) can change. Thus, the system-wide volume is changed in an acoustically-balanced fashion when watching movie.

When the TV decodes all input program channels to PCM channels, these PCM channels are inherently gain-balanced. They are all controlled as one group of channels by single volume attenuation control.

(Estimation logic)

(1) Max SPL. 2 and (2) linearity of volume step is mandated in multi-channel surround system. But, even volume step is linear, SPL out is non linear log scale, because SPL is represented as Log.

Estimation logic for estimating volume level of VR device is perform follows:

(1) Set TV (source device of multi-channel surround system) volume at lowest Max SPL value of all the speakers as reference.

(2) Estimate Rear speaker (sink device of multi-channel surround system) volume by these relational equation.

We know TV max SPL and TV max level and TV current level, so we can find TV ref. SPL by below relational equation.

TV max $SPL$:TV max level = [Equation 1]

TV $ref$. $SPL$:TV current level

Speaker max $SPL$:speaker max level =

Speaker est. $SPL$:speaker current level

TV $ref$. $SPL$ = Speaker $est$. $SPL$

Speaker's estimated(est.) SPL is calibrated to TV ref. SPL, so they are assumed as same value.

By using the speaker side relational equation, speaker current level can be determined. For example, if TV's max SPL is 100 and volume level is 15 out of 20, and Speakers max SPL is 120, and speaker has volume level of 30, TV's SPL at source (TV ref. SPL) is 75. Then speaker volume level will be 18.75.

In the example described above, setting the volume of the TV speaker when the reference volume is initially set is only one example, and the method proposed in the present disclosure is not limited thereto. More specifically, in another embodiment, the speaker used when the reference volume is initially set may be a center speaker. That is, the speaker to which the reference volume is initially set may be the speaker most suitable for the user to listen to the audio data output among several surround speakers.

In addition, in the example described above, although a smart phone having a Bluetooth interface and a built-in microphone as the volume calibration controller has been described as an example, the method proposed in the present disclosure is not limited thereto.

Master Volume Control (Source-Side Gain Adjustment)

After calibration at setup, all the speakers physical volumes are calibrated to common maximum. So all the speakers volume can be easily controlled by source-side gain adjustment.

FIGS. 13 and 14 illustrate an example of a method for master volume control. In FIGS. 13 and 14, 1310 and 1410 indicate physical volume, and 1420 indicate attenuation. FIG. 13 is related to an example of all the speakers whose physical volumes are calibrated to common maximum after calibration at setup. FIG. 14 is related to an example of all the speakers whose volume level are attenuated after calibration at setup.

Master volume control procedure is performed follows:

(1) Lock all the speakers volume at that common maximum.

(2) Attenunate all the speakers volume simultaneously at TV (source device).

(Sink-Side Gain Adjustment)

This method is a method for master volume control based on a table which is related to a mapping relation between (i) the volume level and (ii) SPL output in dB.

In this method, it can be assumed that all the portable speakers and TV speakers are following a table below. The following table is for the volume level/output SPL matching. The following table is for the volume level/output SPL matching may be refer to as a mapping table. no calibration is necessary in this method.

TABLE 2

| Volume Setting | SPL output in dB | Requirement Level | Qualification Test Value |
|---|---|---|---|
| 0 | 0 | | |
| 1 | 0.5 | | |
| ... | ... | | |
| 80 | 40 | M | Yes |
| 100 | 50 | M | |
| 110 | 55 | M | |
| 120 | 60 | M | |
| 130 | 65 | M | |
| 140 | 70 | M | |
| 150 | 75 | M | Yes |
| 160 | 80 | M | |
| 170 | 85 | M | Yes |
| 180 | 90 | O | |
| 190 | 95 | O | Yes, if implemented |
| 200 | 100 | O | |
| 210 | 105 | O | Yes, if implemented |

This method can be used as optional when vendor specific codec is used or as a reference design where all the participating devices are manufactured from single company for easy implementation.

However, due to the distance difference between speakers and user location. Slight individual calibration using VCP/VDS may be still necessary.

Master volume control procedure is performed follows:

(1) all the relations between the speakers volume level and output SPL are mandated.

(2) all the speakers volume is controlled with the mandating value based on mapping table.

FIG. 15 illustrates an example of a method for master volume control based on a mapping table proposed in the present disclosure.

Specifically, FIG. 15 explains actual volume control at 2nd step. In FIG. 15, Sink-side gain adjustment applies gain adjustments in each Multi-channel Sink device in response to volume setting adjustments sent by the Multi-channel Source. the user adjusts the volume on UI (user interface) of the source device (1510), the source device sends a volume setting adjustment to the sink devices (1520), and each sink device adjusts its local gain accordingly.

Because it cannot be assumed that the volume "curve"—i.e. the relationship between changes in volume setting and SPL output—is linear in the sink devices (usually it's log scale), there needs to be a standardized mapping between the digital volume control setting provided by the source and the SPL output from each speaker. This mapping can be defined as shown in the table 2 above. The volume setting has a range from 0 to 210 that maps to a dB SPL range of 0 to 105 in 0.5 dB steps. However, only a subset of the SPL output values is necessary to support, as is indicated in the Requirement Level column. Only a 5-dB resolution is strictly required by this specification, and the interpolation between these 5-dB steps is left to be implementation defined. Furthermore, only a small handful of the entire set of SPL output values should need to be validated during qualification testing. So, for example, when the source sends a volume setting of 100 to the sink devices, each sink device is required to output 50 dB SPL (with some reasonable tolerance).

Mapping volume setting values to SPL output also requires a standardized method for measuring the SPL output of speaker devices during manufacture. There currently exists industry standards for measuring active speaker SPL output, such as CTA-2034-A, and standard techniques are well researched and established. However, what is not available in current standards is the simplified approach warranted for this Bluetooth multi-channel surround-sound system. Work is underway by the editors of this specification on a proposal for a simplified method for measuring speaker SPL output.

This method places the following requirements on the Multi-channel Source device:

(1) Send the volume setting as one Uint8 octet in BASE first-level metadata (2) Read a characteristic in the Multi-channel Surround Service to determine each sink's max output in dB SPL and use these values to determine the maximum volume setting that will be supported by the entire system (3) Other TBD This method places the following requirements on the Multi-channel Sink devices:

(1) Interpret each volume setting value received from the source as a request for a certain dB SPL output and adjust its own internal volume control to produce this output (2) Provide a Max SPL characteristic in the Multi-channel Surround Service (3) Other TBD A/V Synchronization This method is related to a method for audio/video synchronization. When watching a movie with a TV alone without external speakers, the A/V synchronization is guaranteed by the Presentation Time Stamp (PTS) in the MPEG broadcast system. As long as the audio and video movie program content is properly encoded, the TV is able to render the video and audio synchronously.

FIG. 16 shows an example for a method for audio/video synchronization proposed in the present disclosure. More specifically, FIG. 16 is related to how the PTS acts as a reference point for A/V synchronization for both video and audio. when the movie audio is transmitted through Bluetooth LE to external speakers, additional delay is added to the audio playback due to encoding at the source, transporting, and decoding and post-processing at the sink. The video in the TV may also have added after the PTS due to enhancements such as frame doubling, anti-aliasing, etc. Thus, a mechanism for compensating for these audio and video delays is needed.

Sink devices are required to report their native playback latency values such that the source device can determine an appropriate system-wide Presentation_Delay value to be used during playback. The source device will be required to calculate an appropriate Presentation_Delay value to use for all sink devices by taking into account it's own video and audio processing latencies as well as the latency values reported by each sink device.

Speaker Delay Calibration

Due to distance from speakers to user location, not only volume but also delay is affected. FIGS. 17 and 18 illustrate an example of a method for Speaker Delay Calibration proposed in the present disclosure.

As shown in FIG. 17, it is common to place the surround speakers closer to the listening position than the TV would be. Therefore, if the TV plays back the Front Left, Front Right and Center channels, these channels would arrive at the user's ears later than the Left Surround and Right Surround channels.

As shown on FIG. 18, the Left Surround or Right Surround speakers also may be different distances from the listening position with respect to one another, such as is often dictated by the dimensions of the user's room.

To compensate for these distance differences, time delays calibration are needed. The speaker(s) nearest to the listening position need to have their playback delayed to align their sound with that of the farther speaker(s).

The Multi-channel Surround Service running on each speaker can include the characteristic values such as "Distance Delay." The source can use this characteristic to communicate to each speaker how much, if at all, it needs to calibration its output.

The general process is performed as follows:

(1) Source determines distance of each speaker from the listening position. The exact method used is implementation specific.

(2) Source calculates the necessary delay values for each speaker (3) Source writes the delay values to a characteristic on each speaker (4) Each speaker applies any necessary delay.

Test Strategy

The test objectives are to verify functionality of the Multi-channel Surround Profile within a Bluetooth Host and enable interoperability between Bluetooth Hosts on different devices. The testing approach is to cover mandatory and optional requirements in the specification and to match these to the support of the IUT as described in the ICS. Any defined test herein is applicable to the IUT, if the ICS logical expression defined in the test case mapping table (TCMT) evaluates to true.

The test equipment provides an implementation of the Radio Controller and the parts of the Host needed to perform the test cases defined in the Multi-channel Surround Profile test suite. For some test cases, it is necessary to stimulate the IUT from an Upper Tester. In practice, this could be implemented as a special test interface, an MMI, or another interface supported by the IUT. In order to test a Multi-channel Source, there will be test cases in which multiple Lower Testers are required and act as Multi-channel Sinks.

The Multi-channel Source and Multi-channel Sink rely on portions, but not the entirety, of the BAP Unicast Client and Server roles respectively, as well as the BAP Broadcast Source and Sink roles. To the fullest extent possible, testing will reference existing BAP test cases when suitable. Additional BAP specific test cases will only be added when the existing BAP test cases do not adequately describe the Multi-channel IUT usage of the specific BAP role.

This profile relies on elements of the General Audio profiles and services. When entire features and/or roles from those profiles and services are encapsulated in this profile, they will be referenced from this profile's ICS through inter-layer dependencies and tested using the appropriate test suites.

In later phases, the Multi-channel Surround Service will receive greater definition, and it will have a dedicated ICS and test suite, separate from the profile ICS and test suite.

The Multi-channel Surround Profile test suite contains Valid Behavior (BV) tests complemented with Invalid Behavior (BI) tests where required. The test coverage mirrored in the test suite structure is the result of a process that started with catalogued specification requirements that were logically grouped and assessed for testability enabling coverage in defined test purposes.

FIG. 19 illustrates a flow chart of an example for a method performed by a control device which is proposed in the present disclosure.

Specifically, in a short-range wireless communication system, a control device transmits, to a first device, a signal for configuring an audio data output volume of the first device as a reference value (S1910).

And then, the control device transmits, to the first device, a test stream for calibration on a audio data output volume of devices consisting of a multi-channel surround system (S1920).

Lastly, the control device measuring an audio data output of the first device based on (i) the reference value and (ii) the test stream (S1930).

It is apparent to those skilled in the art that the present invention can be embodied in other specific forms without departing from the essential characteristics of the present invention. Accordingly, the foregoing detailed description should not be construed as restrictive in all respects but as exemplary. The scope of the present invention should be determined by a reasonable interpretation of the appended claims, and all modifications within the equivalent scope of the present invention are included in the scope of the present invention.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present disclosure may be implemented by various means, for example, hardware, firmware, software or a combination of them. In the case of implementations by hardware, an embodiment of the present disclosure may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present disclosure may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure. Further, although the disclosure has described both product inventions and process inventions, description of both inventions may be complementarily applied as needed.

What is claimed is:

1. A method performed by a control device in a wireless communication system, the method comprising:
   transmitting, to a first device, a signal for configuring an audio data output volume of the first device as a reference value;
   transmitting, to the first device, a test stream for calibration on a audio data output volume of devices consisting of a multi-channel surround system; and
   measuring an audio data output of the first device based on (i) the reference value and (ii) the test stream, and
   wherein the audio data output of the first device is measured based on a sound pressure level (SPL),
   wherein the measured audio data output of the first device is used as a reference SPL for the calibration.
   wherein the method further comprising:
   transmitting, to a second device and a third device, a signal for configuring an audio data output volume of each of the second device and the third device as a specific value, respectively;
   transmitting the test stream to the second device and the third device, respectively; and
   measuring audio data outputs of each of the second device and the third device which is outputted based on (i) the specific value and (ii) the test stream,
   wherein the audio data outputs of each of the second device and the third device is measured based on the SPL, and
   wherein a measurement on a SPL of the audio data outputs of each of the second device and the third device is repeatedly performed until each of the SPL of the audio data outputs of the second device and the third device is measured to be a same as the reference SPL.

2. The method of claim 1, further comprising:
   configuring the audio data output volume of the devices consisting of the multi-channel surround system.

3. The method of claim 1,
   wherein the configuring the audio data output volume of the devices consisting of the multi-channel surround system is performed based on a pre-configured table on a mapping relationship between a audio data output volume value and a SPL value.

4. A control device in a wireless communication system, the control device comprising:
   a transmitter for transmitting a radio signal;
   a receiver for receiving the radio signal; and
   a processor operatively connected to the transmitter and the receiver,
   wherein the processor is configured to:
   transmit, to a first device, a signal for configuring an audio data output volume of the first device as a reference value;
   transmit, to the first device, a test stream for calibration on a audio data output volume of devices consisting of a multi-channel surround system; and
   measure an audio data output of the first device based on (i) the reference value and (ii) the test stream, and
   wherein the audio data output of the first device is measured based on a sound pressure level (SPL),
   wherein the measured audio data output of the first device is used as a reference SPL for the calibration.
   wherein the processor is further configured to:
   transmit, to a second device and a third device, a signal for configuring an audio data output volume of each of the second device and the third device as a specific value, respectively;

transmit the test stream to the second device and the third device, respectively; and measure audio data outputs of each of the second device and the third device which is outputted based on (i) the specific value and (ii) the test stream, wherein the audio data outputs of each of the second device and the third device is measured based on the SPL, and wherein a measurement on a SPL of the audio data outputs of each of the second device and the third device is repeatedly performed until each of the SPL of the audio data outputs of the second device and the third device is measured to be a same as the reference SPL.

* * * * *